United States Patent
Lohse et al.

[11] 4,384,084
[45] May 17, 1983

[54] HARDENABLE EPOXIDE RESIN MIXTURES CONTAINING CYANOLACTAMS

[75] Inventors: Friedrich Lohse, Oberwil; Dieter Trachsler, Kaiseraugst; Roland Moser, Basel, all of Switzerland

[73] Assignee: Ciba-Geigy Corporation, Ardsley, N.Y.

[21] Appl. No.: 347,402

[22] Filed: Feb. 10, 1982

[30] Foreign Application Priority Data

Feb. 19, 1981 [CH] Switzerland ............... 1105/81

[51] Int. Cl.³ .............. C08G 59/40; C08G 59/44; C08G 59/60
[52] U.S. Cl. ..................... 525/504; 528/94; 528/98; 528/102; 528/116; 528/117; 528/118; 528/323; 528/367; 528/368
[58] Field of Search ............ 528/94, 116, 117, 118, 528/367, 368, 98, 102, 323; 525/504

[56] References Cited

U.S. PATENT DOCUMENTS

| | | | |
|---|---|---|---|
| 3,622,540 | 11/1971 | Hashimoto et al. | 528/116 X |
| 3,759,914 | 9/1973 | Simms et al. | 528/117 X |
| 4,140,658 | 2/1979 | Seltzer . | |
| 4,168,364 | 9/1979 | Seltzer et al. | 528/94 X |

FOREIGN PATENT DOCUMENTS 1905098 8/1970 Fed. Rep. of Germany .
2743015 4/1979 Fed. Rep. of Germany .

OTHER PUBLICATIONS

C.A., 90, 205270t (1979).
C.A., 73, 99400x (1970).

Primary Examiner—Earl A. Nielsen
Attorney, Agent, or Firm—Luther A. R. Hall

[57] ABSTRACT

Hardenable mixtures which contain a polyepoxide compound with, on average, more than one epoxide group in the molecule, and a hardener of the formula I

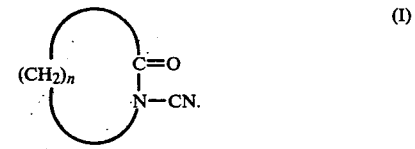

The symbol n is an integer from 3 to 5. The methylene carbon atoms can be substituted by one or two methyl or ethyl groups.

The hardenable mixtures can be used, for example, in the fields of the protection of surfaces or of adhesives technology.

5 Claims, No Drawings

HARDENABLE EPOXIDE RESIN MIXTURES CONTAINING CYANOLACTAMS

The present invention relates to novel hardenable mixtures of polyepoxide compounds and N-cyanolactams as hardeners, and also to the use of these hardeners for hardening polyepoxide compounds.

It is known to use cyanamides as hardeners in the hardening of epoxy resins. Thus, for example, German Offenlegungsschrift No. 2,743,015 describes a process for hardening epoxy resins with aqueous cyanamide solution or cyanamide-urea solution. Hardenable epoxide resin mixtures which contain cyanamides of secondary amines, such as cyclic amines, as hardeners are known from German Offenlegungsschrift No. 2,856,771. These hardeners are particularly suitable for the preparation of one-componenet systems (all constituents in one pack).

There is furthermore a need for resin/hardener mixtures of especially good storage stability. In these mixtures, the hardener should be highly reactive so that it can be used for systems, for example the protection of surfaces, where rapid hardening is required.

N-substituted lactams, such as N-cyanolactams, are described in German Offenlegungsschrift No. 1,905,098 as effective activators for the preparation of polyamides.

It has now been found that N-cyanolactams are hardeners of excellent effectiveness and good storage stability for polyepoxides.

The invention therefore relates to hardenable mixtures containing a polyepoxide compound with, on average, more than one epoxide group in the molecule, and a hardener, wherein the hardener corresponds to the formula I

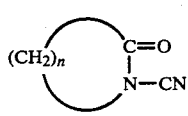 (I)

in which n is an integer from 3 to 5 and the methylene carbon atoms are unsubstituted or substituted by one or two methyl or ethyl groups.

Examples of N-cyanolactams of formula I are: N-cyanopyrrolidone, N-cyanopiperidone, N-cyanocaprolactam and 5-methyl-N-cyanopyrrolidone.

Mixtures in which the hardener of the formula I does not have any substituents on the methylene carbon atoms are preferred.

The mixing proportions can be chosen so that the mixtures according to the invention contain 0.4 to 1.2 mols, preferably 0.5 to 1 mol, of hardener of the formula I per epoxide equivalent.

Possible epoxide compounds for the hardenable mixtures according to the invention are, in particular, those with, on average, more than one glycidyl group or β-methyl-glycidyl group bonded to a hetero-atom, preferably oxygen or nitrogen, or those with, on average, more than one epoxycyclohexyl grouping. These polyepoxide compounds are, in particular:

(a) diglycidyl or polyglycidyl ethers of polyhydric aliphatic alcohols such as 1,4-butanediol, neopentylglycol or polyalkylene glycols, such as polypropylene glycols, (b) diglycidyl or polyglycidyl ethers of cycloaliphatic polyols such as 2,2-bis-(4-hydroxycyclohexyl)-propane or 1,4-bis-(hydroxymethyl)-cyclohexane, (c) diglycidyl or polyglycidyl ethers of polyhydric phenols such as resorcinol, bis-(p-hydroxyphenyl)-methane, 2,2-bis-(p-hydroxyphenyl)-propane (=diomethane), 2,2-bis-(4'-hydroxy-3',5'-dibromophenyl)-propane or 1,1,2,2-tetrakis-(p-hydroxyphenyl)-ethane, or of condensation products of phenols with formaldehyde, obtained under acid conditions, such as phenol novolacs and cresol novolacs, (d) di-(β-methylglycidyl) or poly-(β-methylglycidyl) ethers of the abovementioned polyhydric alcohols or polyhydric phenols, (e) compounds with epoxycyclohexyl groupings, such as 3',4'-epoxycyclohexylmethyl 3,4-epoxycyclohexylcarboxylate, 3-(3',4'-epoxycyclohexyl)-2,4-dioxa-spiro[5,5]-8,9-epoxy-undecane or bis-(3,4-epoxycyclohexylmethyl) adipate, (f) diglycidyl or polyglycidyl esters of polybasic carboxylic acids such as phthalic acid, terephthalic acid, Δ$^4$-tetrahydrophthalic acid, hexahydrophthalic acid or trimellitic acid, and (g) N-glycidyl derivatives of amines, amides and heterocyclic nitrogen bases, such as N,N-diglycidylaniline, N,N-diglycidyltoluidine, N,N,N',N'-tetraglycidyl-bis-(p-aminophenyl)-methane, the triglycidyl compound of p-hydroxyaniline, triglycidyl isocyanurate, N,N'-diglycidylethyleneurea, N,N'-diglycidyl-5,5-dimethylhydantoin, N,N'-diglycidyl-5-isopropylhydantoin or N,N'-diglycidyl-5,5-dimethyl-6-isopropyl-5,6-dihydrouracil.

Mixtures of the said diepoxides and polyepoxides can also be used.

The hardening of the hardenable mixtures according to the invention to give mouldings and the like can be carried out in the temperature range from 80° C. to 250° C., preferably from 120° to 180° C.

In order to shorten the gelling or hardening times, known hardening catalysts can be added to the mixture. Examples of suitable catalysts are tertiary amines such as triethylamine or benzyldimethylamine, pyridine and substituted pyridine derivatives, for example 4-dimethylaminopyridine, alkali metal alcoholates, for example sodium hexylate, imidazoles, for example 2-ethyl-4-methyl-imidazole or 1-methylimidazole, quaternary ammonium salts, for example tetramethylammonium chloride or benzyltrimethylammonium chloride, Lewis acids, for example tin(II) chloride, lithium chloride or also boron trifluoride etherate, or N-p-chlorophenyl-N',N'-dimethylurea ("Monuron").

The mixtures according to the invention preferably contain an amino compound as a hardening catalyst.

The catalysts can be used in amounts of 0.1 to 5% by weight, preferably 0.1 to 2% by weight, based on the reaction mixture.

The N-cyanolactams of the formula I are known compounds and can be prepared by known methods. However, they can also be prepared by a procedure in which a compound of the formula II

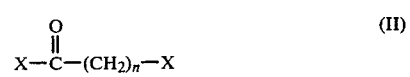 (II)

in which the definitions given under formula I apply to n and the methylene carbon atoms, and the symbols X independently of one another are a halogen atom, is reacted with cyanamide or a cyanamide salt, in the presence of an inorganic hydrogen halide acceptor.

The preferred procedure is to react 1 mol of the compound of the formula II with 1 mol of cyanamide, in the presence of 2 mols of an inorganic hydrogen halide acceptor, or with 1 mol of a cyanamide salt, in the presence of 1 mol of an inorganic hydrogen halide acceptor.

The symbols X in the formula II can independently of one another be chlorine, bromine or iodine, in particular chlorine or bromine.

Examples of compounds of the formula II are: γ-chlorobutyric acid chloride, γ-bromobutyric acid chloride, δ-chlorovaleric acid chloride, δ-bromovaleric acid chloride, ε-chlorohexanoic acid chloride, ε-bromohexanoic acid chloride, γ-chlorovaleric acid chloride and also the corresponding bromides.

Cyanamide or salts of cyanamide are used as co-reactants for the said ω-halogenoacyl halides of the formula II. The cyanamide can be used in solid form or as an aqueous solution. Possible cyanamide salts are salts with alkali metals and alkaline earth metals. The salts with alkali metals, in particular with sodium and potassium, are preferred.

Examples of bases suitable as hydrogen halide acceptors are the hydroxides, carbonates and bicarbonates of alkali metals and alkaline earth metals. Alkali metal hydroxides, in particular sodium hydroxide or potassium hydroxide, are preferably used as the hydrogen halide acceptor.

The process is preferably carried out in such a way that approximately equivalent amounts of the reactants are brought together at 0°–10° C. and the reaction mixture is then warmed to 30°–100° C.

The reaction can be carried out in an aqueous or organic solution. Possible organic solvents are preferably aprotic solvents such as dimethylformamide and dimethylacetamide.

The N-cyanolactams of the formula I can be isolated by evaporation of the solution and extraction of the residue with an organic solvent. Suitable organic solvents are water-immiscible solvents, for example: aromatic hydrocarbons, for example toluene or xylene, halogenated hydrocarbons, for example methylene chloride, halogenated aromatic hydrocarbons, for example chlorobenzene, dichlorobenzene or chloronaphthalene, ethers such as diethyl, diisopropyl and di-n-butyl ethers, dioxane or diphenyl ether, and esters such as n-butyl acetate.

The compounds of the formula II are known and the majority are commercially available or can be prepared by known methods.

The hardenable mixtures, according to the invention, of polyepoxide compounds and the N-cyanolactum of the formula I can furthermore be treated, before hardening, in any phase, with customary modifiers such as extenders, fillers and reinforcing agents, pigments, dyes, organic solvents, plasticisers, levelling agents, thixotropic agents, flame retarders or mould release agents.

Examples of extenders, reinforcing agents, fillers and pigments which can be used in the hardenable mixtures according to the invention are: coal tar, bitumen, liquid coumarone-indene resins, textile fibres, glass fibres, asbestos fibres, boron fibres, carbon fibres, cellulose, polyethylene powder, polypropylene powder, quartz powder, mineral silicates such as mica, asbestos powder, powdered slate, kaolin, aluminum oxide trihydrate, powdered chalk, gypsum, antimony trioxide, bentone, silicic acid aerogel, lithopone, barytes, titanium dioxide, carbon black, graphite, oxide colorants such as iron oxide, or metal powders such as aluminum powder or iron powder.

Examples of suitable organic solvents for modifying the hardenable mixtures are toluene, xylene, butyl acetate, acetone and methyl ethyl ketone.

Examples of plasticisers which can be used for modifying the hardenable mixtures are dibutyl, dioctyl and dinonyl phthalate, tricresyl phosphate, trixylenyl phosphate and diphenoxyethylformaldehyde.

Examples of levelling agents which can be added when using the hardenable mixtures especially in the protection of surfaces are silicones, liquid acrylic resins, cellulose acetobutyrate, polyvinylbutyral, waxes, stearates and the like (some of which are also used as mould release agents).

The preparation of the hardenable mixtures according to the invention can be carried out in the customary manner with the aid of known mixing equipment (stirrers, kneaders, rolls or, in the case of solid substances or powders, in mills or dry mixers). In some cases, it is necessary to warm the mixture briefly in order to achieve sufficient homogeneity.

The N-cyanolactam hardeners of the formula I, used in the mixtures according to the invention, are latent reactive hardeners. They are particularly suitable for preparing one-component systems which are stable on storage.

The hardenable mixtures according to the invention are used, in particular, in the fields of the protection of surfaces, electrical engineering, lamination processes and adhesives technology, and in construction. They can be used, in the preparation suited in each case to the particular intended application, with or without a filler, if appropriate in the form of solutions or emulsions, as coating agents, solvent-free coatings, sinter powders, compression-moulding compositions, injection-moulding preparations, dipping resins, casting resins, impregnating resins, plastic foams, films, sheets, matrix materials, binders and adhesives, tooling resins, laminating resins, sealing and filling compounds, floor-covering compositions and binders for mineral aggregates.

The following examples illustrate the invention. The following test methods are used in these examples:

Torsional adhesive strength

To measure the torsional adhesive strength, 5 hollow aluminum cylinders (external diameter: 12 mm) are stuck onto a strong aluminum plate with the resin mixture to be tested, the adhesion surfaces of the cylinders and of the plates having been cleaned and treated beforehand by the pickling process (1 hour in chromosulfuric acid at 60° C.). The test samples are then left for varying hardening times and at varying hardening temperatures. After cooling to room temperature, a continuously increasing torsional moment is exerted on the hollow cylinders by means of a hexagonal tube. Via a lever arm, the torsional moment which stresses the adhesive bond is measured by a force sensor and recorded electrically. The shearing stress in the adhesive layer then increases until the bond breaks, the force needed to break the bond being recorded in $N.mm^{-2}$.

Reactivity

This is determined by measuring the gelling time at various temperatures. In this process, a drop of the mixture to be tested is applied to the middle of a heating plate set at the desired temperature, and the time taken for the sample to gel is determined.

Determination of the glass transition temperature (GTT)

4 g of the resin/hardener mixture are poured in each case into a thin-walled Al crucible having a diameter of about 5 cm, and hardened therein. A sample of the disc obtained is taken in order to determine the GTT of the cross-linked polymer with the aid of differential thermal analysis (DTA). At the transition temperature, the specific heat changes and this change is recorded as a point of inflection on the curve plotted by the DTA instrument [type TA 2000 from Mettler (Greifensee, Switzerland), heating rate: 16° C./minute]. The GTT makes it possible to draw conclusions concerning the heat distortion point of the resulting polymer.

Test for suitability as an adhesive

A small amount of the resin/hardener mixture is applied in each case to the ends of test strips of Anti-corodal B having the dimensions 170×25×1.5 mm, which have previously been roughened by abrasion and degreased by washing with solvent. In each case, two of these strips are adjusted with the aid of a gauge so that the ends coated with resin/hardener mixture overlap by 12 mm. They are fixed with a clamp until the adhesive has hardened. The tensile shearing strength of the adhesive bond is then tested according to DIN 53,183 (DIN=Deutsche Industrie Norm (German Industrial Standard)).

Determination of the mechanical and dielectric properties of mouldings

The resin/hardener mixtures are freed of the air which has been incorporated therein during mixing, and then cast into aluminum moulds which have been pretreated with mould release agent, in order to prepare plates having the dimensions 135×135×4 mm or 135×135×2 mm, and hardened under the conditions indicated in the examples.

The 4 mm thick plates are used to prepare test-pieces having the dimensions 60×10×4 mm, in order to determine the flexural strength according to VSM-77,103, the sag, the impact bending strength according to VSM-77,105, and the weight increase after storage in water (VSM=Verband Schweizerischer Maschinenindustrieller (Association of Swiss Machine Manufacturers)).

Test-pieces having the dimensions 120×10×4 mm are used to determine the heat distortion point according to ISO Standard 75 (ISO=International Standards Organisation). The 2 mm thick plates are used to determine the dielectric properties.

A liquid, unmodified bisphenol A diglycidyl ether, with an epoxide content of 5.3–5.4 equivalents/kg and a viscosity of about 10,000 mPa.s/25° C., is used as the epoxide resin component in Examples 1–9.

Parts are by weight and percentages are by weight.

EXAMPLE A (Preparation of N-cyanopyrrolidone)

80 g (2 mols) of sodium hydroxide are dissolved in 500 ml of water, and 42 g (1 mol) of cyanamide are added to the solution in portions, after cooling to 0° C. 141.0 g (1 mol) of γ-chlorobutyric acid chloride are added dropwise to the clear and colourless cyanamide solution, in the course of 2 hours, at 0° to 5° C., care being taken to ensure adequate cooling. After the dropwise addition has ended, the mixture is stirred for a further hour at the same temperature. 1 liter of methylene chloride is then added and the reaction mixture is warmed at the reflux temperature (40° C.) for one hour. The two clear and colourless phases are separated in a separating funnel, the organic phase is dried with sodium sulfate and filtered and the solvent is removed under a waterpump vacuum.

Yield: 100 g (99.9% of theory). The crude product is a pale yellowish and slightly cloudy liquid.

Distillation of the crude product under high vacuum gives 78.2 g (71% of theory) of N-cyanopyrrolidone, which, according to the gas chromatogram, contains 95.85% of N-cyanopyrrolidone together with 3.43% of an isomer, as a colourless clear liquid with a boiling point of 92°–94° C./6.67 Pa.

EXAMPLE B (Preparation of N-cyanopiperidone)

59.4 g (1.484 mols) of sodium hydroxide are dissolved in 370 ml of water, and 13.2 g (0.742 mol) of cyanamide are added in portions to the solution, after cooling to 0° C. 115.0 g (0.742 mol) of δ-chlorovaleric acid chloride are added dropwise to the clear and colourless cyanamide solution, in the course of one hour, at 0° to 8° C.; a strongly exothermic reaction is observed during this dropwise addition and the mixture must therefore be cooled intensively. After the dropwise addition has ended, the mixture is stirred for a further hour at 0° C. 740 ml of methylene chloride are then added and the reaction mixture is warmed at the reflux temperature (40° C.) for one hour. The two phases are separated in a separating funnel. The aqueous phase is extracted again with 740 ml of methylene chloride.

The combined organic phases are dried with sodium sulfate and filtered and the solvent is removed under a waterpump vacuum. Yield: 79.6 g (86.4% of theory). The crude product is a pale yellowish liquid which, according to the gas chromatogram, contained 79.95% of N-cyanopiperidone. After distillation under high vacuum, 44.0 g (47.8% of theory) of N-cyanopiperidone, which, according to the gas chromatogram, contains 99.19% of N-cyanopiperidone, are obtained as a pale yellowish, clear liquid having a boiling point of 125° C./13.3 Pa.

EXAMPLE 1

N-cyanopyrrolidone and the epoxide resin are mixed at room temperature in a molar ratio of 1.84:1 (corresponding to 0.92 mol of cyanolactam per epoxide equivalent). 0.5% by weight of benzyldimethylamine is added to the mixture as a catalyst. The adhesive bond forms at room temperature. Torsional adhesive strength:
Hardened for 1 hour at 180° C.: 88.4 N.mm$^{-2}$
Hardened for 5 hours at 140° C.: 81.5 N.mm$^{-2}$

EXAMPLE 2

N-cyanocaprolactam and the epoxide resin are mixed at 40° C. in a molar ratio of 1.84:1 (corresponding to 0.92 mol of cyanolactam per epoxide equivalent). 0.5% by weight of benzyldimethylamine is added to the mixture as a catalyst. Torsional adhesive strength:
Hardened for 1 hour at 140° C.: 65 N.mm$^{-2}$
Hardened for 1 hour at 180° C.: 83 N.mm$^{-2}$
Hardened for 5 hours at 140° C.: 79 N.mm$^{-'}$

EXAMPLE 3

N-cyanopiperidone and the epoxide resin are mixed at room temperature in a molar ratio of 1.84:1 (corresponding to 0.92 mol of cyanolactam per epoxide equivalent). 0.6% by weight of benzyldimethylamine is added to the mixture as a catalyst. The adhesive bond forms at room temperature. Torsional adhesive strength:
Hardened for 1 hour at 140° C.: 80.8 N.mm$^{-2}$
Hardened for 1 hour at 180° C.: 85.1 N.mm$^{-2}$
Hardened for 5 hours at 140° C.: 83.3 N.mm$^{-2}$

EXAMPLE 4

N-cyanocaprolactam is mixed with the epoxide resin in varying molar amounts, at room temperature. The samples are hardened in each case for 6 hours at 120° C. and then for 6 hours at 180° C., and tested. The results are collated in Table 1.

TABLE 1

| Parts of N—cyano-caprolactam per 100 parts of epoxide resin | | 24.8 | 37.3 | 55.9 | 74.5 | 89.4 |
|---|---|---|---|---|---|---|
| Mols/epoxide equivalent | | 0.33 | 0.5 | 0.75 | 1 | 1.2 |
| Gelling time at in minutes (') and seconds ('') | 180° C. | 6'50" | 5'40" | 5'30" | 5'10" | 5'50" |
| | 140° C. | 31' | 31' | 31' | 31' | 32' |
| GTT (°C.) | | 151 | 188 | 189 | 164 | 166 |

EXAMPLE 5

The procedure of Example 4 is followed, with the difference, however, that N-cyanopyrrolidone is used in place of N-cyanocaprolactam. The samples are hardened for 6 hours at 180° C. The results are collated in Table 2.

TABLE 2

| Parts of N—cyano-pyrrolidone per 100 parts of epoxide resin | 19.8 | 29.7 | 44.6 | 59.4 | 71.3 |
|---|---|---|---|---|---|
| Mols/epoxide | 0.33 | 0.5 | 0.75 | 1 | 1.2 |
| Gelling time at 180° C. | ~5 hours | 2 hours 5' | 1 hour 15' | 55' | 1 hour 5' |
| GTT (°C.) | 95 | 91 | 181 | 152 | 134 |

EXAMPLE 6

100 parts of epoxide resin are mixed with 37.3 parts of N-cyanocaprolactam (0.5 mol/epoxide equivalent) and, if appropriate, with a catalyst, at room temperature. The test results are collated in Table 3.

The following compounds are used as catalysts:

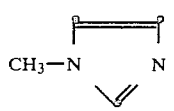

Benzyldimethylamine     II.

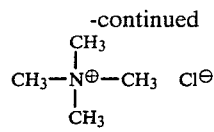

0.9% Na hexylate solution in hexanetriol     IV.

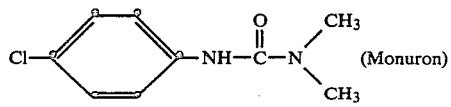

(Monuron)     V.

TABLE 3

| Catalyst | — | I | II | III | IV | V |
|---|---|---|---|---|---|---|
| Parts of catalyst | — | 0.5 | 0.5 | 0.05 | 0.5 | 1 |
| Gelling time at 180° C. | 5'40" | 1'15" | 2'45" | 2' | 3'3" | 4'30" |
| at 140° C. | 31' | 4'30" | 12' | 9'40" | 21'35" | 20' |
| GTT (°C.) after hardening for 6 hours at 120° C. | 68 | 104 | 72 | 66 | 61 | 59 |
| GTT (°C.) after hardening for 6 hours at 120° C. + 6 hours at 180° C. | 188 | 164 | 166 | 170 | 165 | 170 |

EXAMPLE 7

The procedure of Example 6 is followed, with the difference, however, that 44.6 parts of N-cyanopyrrolidone (0.75 mol/epoxide equivalent) are used in place of N-cyanocaprolactam. The results are collated in Table 4.

TABLE 4

| Catalyst | — | I | II |
|---|---|---|---|
| Gelling time* at 180° C. | 1 hour 15' | 8'50" | 14' |
| at 140° C. | >6 hours | 47'15" | 57' |
| GTT (°C.) after hardening for 12 hours at 120° C. | does not harden | 122 | 88 |
| GTT (°C.) after hardening for 6 hours at 120° C. + 6 hours at 180° C. | 180 | 153 | 154 |

*Gelling time in hours, minutes (') and seconds (")

EXAMPLE 8

100 parts of epoxide resin are mixed in each case with 37.3 parts of N-cyanocaprolactam (0.5 mol/epoxide equivalent) at room temperature. One mixture is hardened without a catalyst (mixture A). 0.5 part of the catalyst II is added to the other mixture (mixture B), which is then hardened. The properties of the mouldings obtained are collated in Table 5.

TABLE 5

| | Mixture | | | |
|---|---|---|---|---|
| | A | | B | |
| Hardening | 6 hours 120° C. | 6 hours 120° C. + 6 hours 180° C. | 6 hours 120° C. | 6 hours 120° C. + 6 hours 180° C. |
| Impact bending strength (kJ/m$^2$) | 9.5 | 14.5 | 16 | 15.5 |

TABLE 5-continued

| | Mixture | | | |
|---|---|---|---|---|
| | A | | B | |
| Flexural strength N/mm² | 107*/101** | 87 | 120 | 96 |
| Sag (mm) | 6*/7.8** | 8.3 | 6.8 | 8.2 |
| GTT (°C.) | 6.8 | 188 | 104 | 164 |
| Heat distortion point (°C.) | 63 | 162 | 94 | 163 |
| Tensile shearing strength (N/mm²) | 13.1 | 10.4 | 17.5 | 12.5 |
| Water uptake after storage for 4 days in H₂O at room temperature (%) | 0.28 | 0.44 | 0.33 | 0.51 |
| Water uptake after storage for 1 hour in boiling water (%) | 0.8 | 0.36 | 0.78 | 0.44 |
| Dielectric loss factor tan δ tan δ > 1% above °C. | 30° C. | 84° C. | 53° C. | 80° C. |
| tan δ > 5% above °C. | 58° C. | 143° C. | 82° C. | 135° C. |
| Dielectric constant ε at 23° C. | 3.8 | 3.8 | 3.9 | 3.8 |
| Volume resistivity at 23° C. (Ω cm) | $1.2 \cdot 10^{16}$ | $8.8 \cdot 10^{15}$ | $1.5 \cdot 10^{16}$ | $1.3 \cdot 10^{16}$ |

*value at maximum load
**value at break

EXAMPLES 9–13

Hardening with structurally different epoxide resins

EXAMPLE 9

100 parts of epoxide resin are mixed with 44.6 parts of N-cyanopyrrolidone (0.75 mol/epoxide equivalent) at room temperature. 0.5 part of catalyst I is added to the mixture, which is then hardened.

EXAMPLE 10

100 parts of diglycidyl hexahydrophthalate, with an epoxide content of 5.8 equivalents/kg and a viscosity of 800 mPa.s/25° C., are mixed with 47.9 parts of N-cyanopyrrolidone (0.75 mol/epoxide equivalent) and with 0.5 part of catalyst I, and the mixture is then hardened.

EXAMPLE 11

100 parts of N,N,N',N'-tetraglycidyl-bis-(p-aminophenyl)-methane, with an epoxide content of 9.4 equivalents/kg, are mixed with 77.6 parts of N-cyanopyrrolidone (0.75 mol/epoxide equivalent) and with 0.5 part of catalyst I, and the mixture is then hardened.

EXAMPLE 12

100 parts of a mixture of N,N'-diglycidyl-5,5-dimethyl-hydantoin and 1-(2'-glycidyloxyethyl)-3-glycidyl-5,5-dimethyl-hydantoin, with an epoxide content of 7.05 equivalents/kg and a viscosity of 1,300 mPa.s/25° C., are mixed with 58.2 parts of N-cyanopyrrolidone (0.75 mol/epoxide equivalent) and with 0.5 part of catalyst II, and the mixture is then hardened.

EXAMPLE 13

100 parts of a phenol novolac epoxy compound, with an epoxide content of 5.67 equivalents/kg and a viscosity of 40,000 mPa.s/50° C., are mixed with 46.7 parts of N-cyanopyrrolidone (0.75 mol/epoxide equivalent) and with 0.5 part of catalyst II, and the mixture is then hardened.

The mixtures from Examples 9–13 are hardened for 6 hours at 120° C. and for a further 6 hours at 180° C. The properties of the mouldings obtained are collated in Table 6.

TABLE 6

| Mixture according to Example | 9 | 10 | 11 | 12 | 13 |
|---|---|---|---|---|---|
| Gelling time 180° C. in minutes (') and seconds (") | 8'50" | 3' | 2'45" | 9'25" | 5'30" |
| at 140° C. | 47'15" | 13'45" | 14'05" | 41'40" | 21'43" |
| Impact bending strength (kJ/m²) | 13.3 | 12.8 | 4.5 | 10.0 | 7.0 |
| Flexural strength (N/mm²) | 138 | 163*/148** | 85 | 146 | 109 |
| Sag (mm) | 7.5 | 8*/12.2** | 3 | 6.7 | 4.2 |
| Heat distortion point (°C.) | 142 | 107 | 197 | 140 | 177 |
| Dielectric loss factor tan δ tan δ 1% above °C. | 50 | 50 | | 50 | 50 |
| tan δ 5% above °C. | 135 | 90 | | 100 | 148 |
| Dielectric constant ε at 23° C. | 4.0 | 4.1 | | 4.3 | 4.0 |
| Volume resistivity at 23° C. (Ω cm) | $1.1 \cdot 10^{16}$ | $6.0 \cdot 10^{15}$ | | $1.5 \cdot 10^{16}$ | $4.1 \cdot 10^{15}$ |

*value at maximum load
**value at break

EXAMPLE 14

(test for the storage stability)

If mixture A from Example 8 is stored at room temperature, the initial viscosity of 1,500 mPa.s/25° C. has only doubled after a storage time of 11 days. After a storage time of 150 days, the system is still fluid (not hardened). The results of the test are collated in Table 7. The conversion is measured by means of the thermoanalyser TA 2000 and calculated from the decrease in the enthalpy (dynamic experiment with a heating rate of 4° C./minute).

TABLE 7

| Storage time at room temperature, in days | Tensile shearing strength hardening for 8 hours at 140° C. (N/mm²) | Enthalpy kJ/epoxide equivalent | Conversion (%) |
|---|---|---|---|
| 0 | 15.7 | 198.3 | — |
| 10 | 14.1 | 196.5 | 0.9 |
| 30 | 13.3 | 195.9 | 1.2 |
| 60 | 12.5 | 194.7 | 1.8 |
| 90 | 12.4 | 188.3 | 5.0 |
| 150 | 12.1 | 186.7 | 5.9 |

What is claimed is:

1. A hardenable mixture containing a polyepoxide compound with, on average, more than one epoxide group in the molecule, and a hardener, wherein the hardener corresponds to the formula I (I)

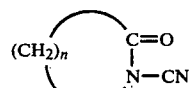

in which n is an integer from 3 to 5 and the methylene carbon atoms are unsubstituted or substituted by one or two methyl or ethyl groups.

2. A hardenable mixture according to claim 1, wherein the hardener of the formula I does not have any substituents on the methylene carbon atoms.

3. A hardenable mixture according to claim 1, which contains 0.4 to 1.2 moles of hardener of the formula I per epoxide equivalent.

4. A hardenable mixture according to claim 3, which contains 0.5 to 1 mole of hardener of the formula I per epoxide equivalent.

5. A hardenable mixture according to claim 1, which contains an amino compound as a hardening catalyst.

* * * * *